(12) United States Patent
Shapiro

(10) Patent No.: US 9,740,898 B1
(45) Date of Patent: Aug. 22, 2017

(54) PERSON-MONITORING SYSTEM

(71) Applicant: Bert Shapiro, Boca Raton, FL (US)

(72) Inventor: Bert Shapiro, Boca Raton, FL (US)

( * ) Notice: Subject to any disclaimer, the term of this patent is extended or adjusted under 35 U.S.C. 154(b) by 0 days.

(21) Appl. No.: 15/231,962

(22) Filed: Aug. 9, 2016

(51) Int. Cl.
  *G08B 23/00* (2006.01)
  *G06K 7/10* (2006.01)
  *H04L 29/08* (2006.01)

(52) U.S. Cl.
  CPC ..... *G06K 7/10396* (2013.01); *G06K 7/10336* (2013.01); *G08B 23/00* (2013.01); *H04L 67/24* (2013.01)

(58) Field of Classification Search
  CPC .................................................. G06K 7/10396
  USPC ...................................................... 340/573.1
  See application file for complete search history.

(56) References Cited

U.S. PATENT DOCUMENTS

| | | | |
|---|---|---|---|
| 5,680,105 A | 10/1997 | Hedrick | |
| 5,689,240 A * | 11/1997 | Traxler | G08B 21/0288 340/539.1 |
| 5,939,981 A * | 8/1999 | Renney | G08B 21/0227 340/407.1 |
| 6,624,752 B2 * | 9/2003 | Klitsgaard | A45C 13/24 340/572.1 |
| 7,301,453 B2 | 11/2007 | Fry | |
| 8,169,324 B2 * | 5/2012 | Kuzniar | G06Q 10/08 119/712 |
| 2005/0073419 A1 * | 4/2005 | Gary, Jr. | G08B 21/0202 340/573.1 |
| 2006/0164237 A1 * | 7/2006 | Medve | G07C 9/00111 340/539.13 |
| 2007/0194099 A1 * | 8/2007 | Miller | A61B 5/1112 235/375 |
| 2013/0234827 A1 * | 9/2013 | Tomita | G08C 23/04 340/5.61 |
| 2014/0057646 A1 | 2/2014 | Vaananen | |
| 2014/0148196 A1 * | 5/2014 | Bassan-Eskenazi | G01S 11/02 455/456.1 |
| 2014/0324527 A1 | 10/2014 | Kulkarni | |
| 2015/0302716 A1 * | 10/2015 | Portalise | G08B 21/0283 340/539.13 |
| 2016/0063836 A1 * | 3/2016 | Fishwick | G08B 21/0272 340/8.1 |
| 2016/0344536 A1 * | 11/2016 | Kumar | H04L 7/0008 |

FOREIGN PATENT DOCUMENTS

WO         2014029911 A1    2/2014

* cited by examiner

*Primary Examiner* — Santiago Garcia

(74) *Attorney, Agent, or Firm* — Kyle A. Fletcher, Esq.

(57) ABSTRACT

The person monitoring system is a proximity surveillance system. The person monitoring system comprises an interrogator, a tag, and an accessory. A communication link established between the interrogator and the tag at predetermined, but not necessarily regular, intervals to ensure that the tag is in the proximity of the interrogator. The tag is attached to an accessory. The person monitoring system is adapted for use with a first person and a second person. The first person carries the interrogator. The second person wears the accessory with the tag. Should the communication link fail to be established, the interrogator initiates an alarm informing the first person that the second person is no longer nearby.

3 Claims, 5 Drawing Sheets

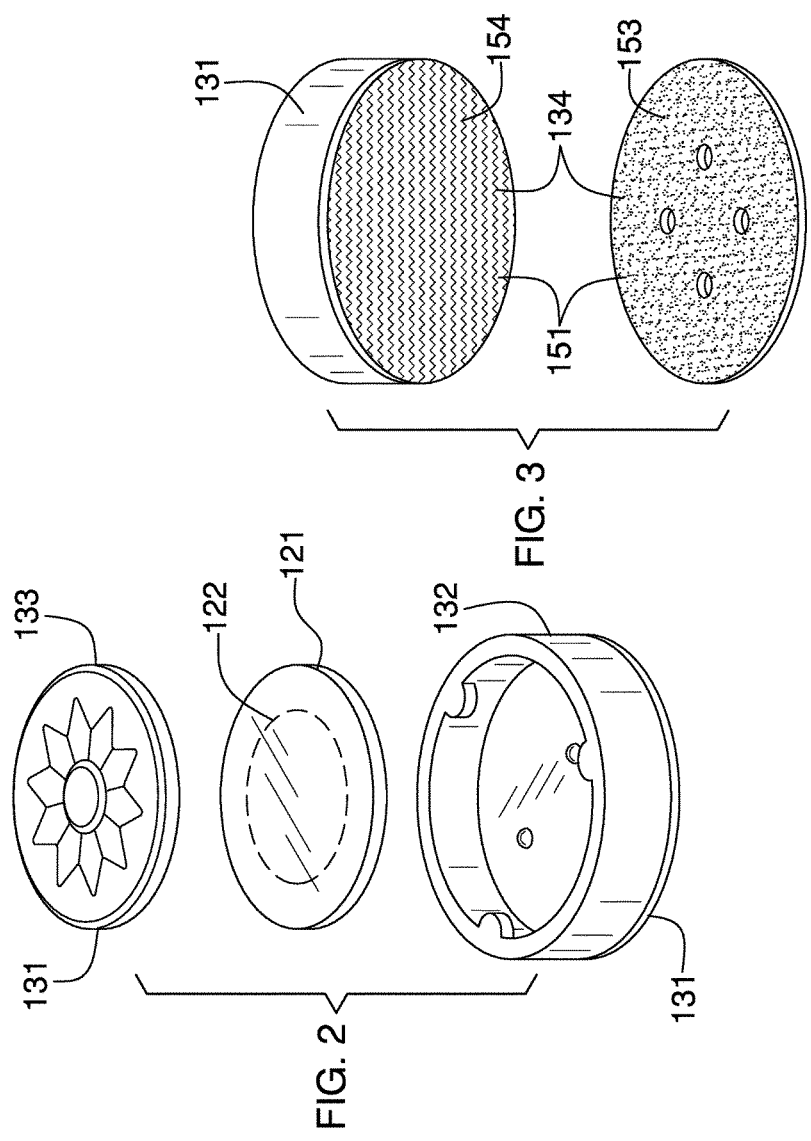

PERSON-MONITORING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling and signaling systems, more specifically, an alarm system responsive to a single undesirable or abnormal operating event.

SUMMARY OF INVENTION

The person monitoring system is a proximity surveillance system. The person monitoring system comprises an interrogator, a tag, and an accessory. A communication link is established between the interrogator and the tag at predetermined, but not necessarily regular, intervals to ensure that the tag is in the proximity of the interrogator. The tag is attached to an accessory. The person monitoring system is adapted for use with a first person and a second person. The first person carries the interrogator. The second person wears the accessory with the tag. Should the communication link fail to be established, the interrogator initiates an alarm informing the first person that the second person is no longer nearby.

These together with additional objects, features and advantages of the person monitoring system will be readily apparent to those of ordinary skill in the art upon reading the following detailed description of the presently preferred, but nonetheless illustrative, embodiments when taken in conjunction with the accompanying drawings.

In this respect, before explaining the current embodiments of the person monitoring system in detail, it is to be understood that the person monitoring system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the person monitoring system.

It is therefore important that the claims be regarded as including such equivalent construction insofar as they do not depart from the spirit and scope of the person monitoring system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is an exploded view of an embodiment of the disclosure.

FIG. 3 is a bottom view of an embodiment of the disclosure.

DETAILED DESCRIPTION OF THE EMBODIMENT

Figure 1:
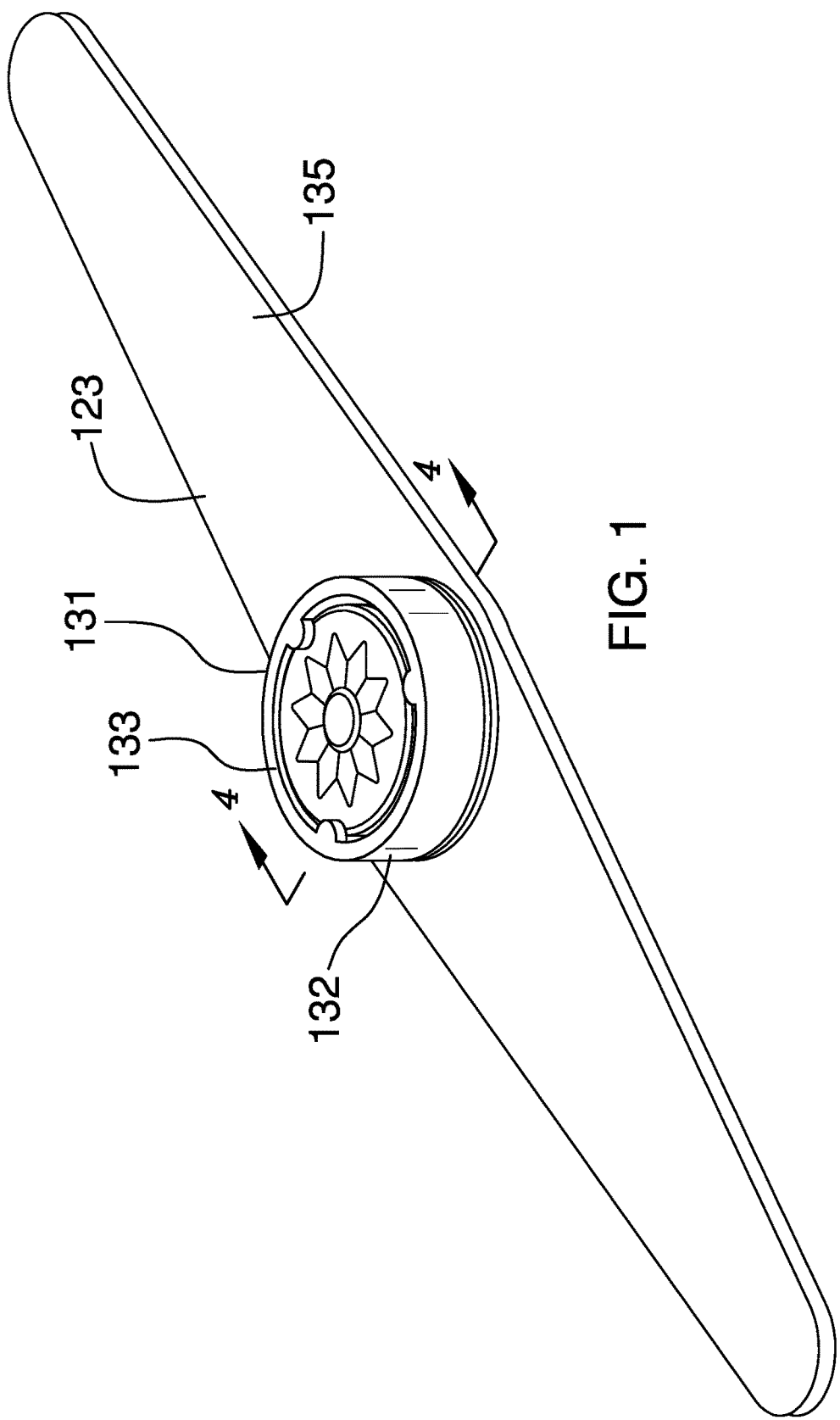
FIG. 1 is a perspective view of an embodiment of the disclosure.
Figure 4:
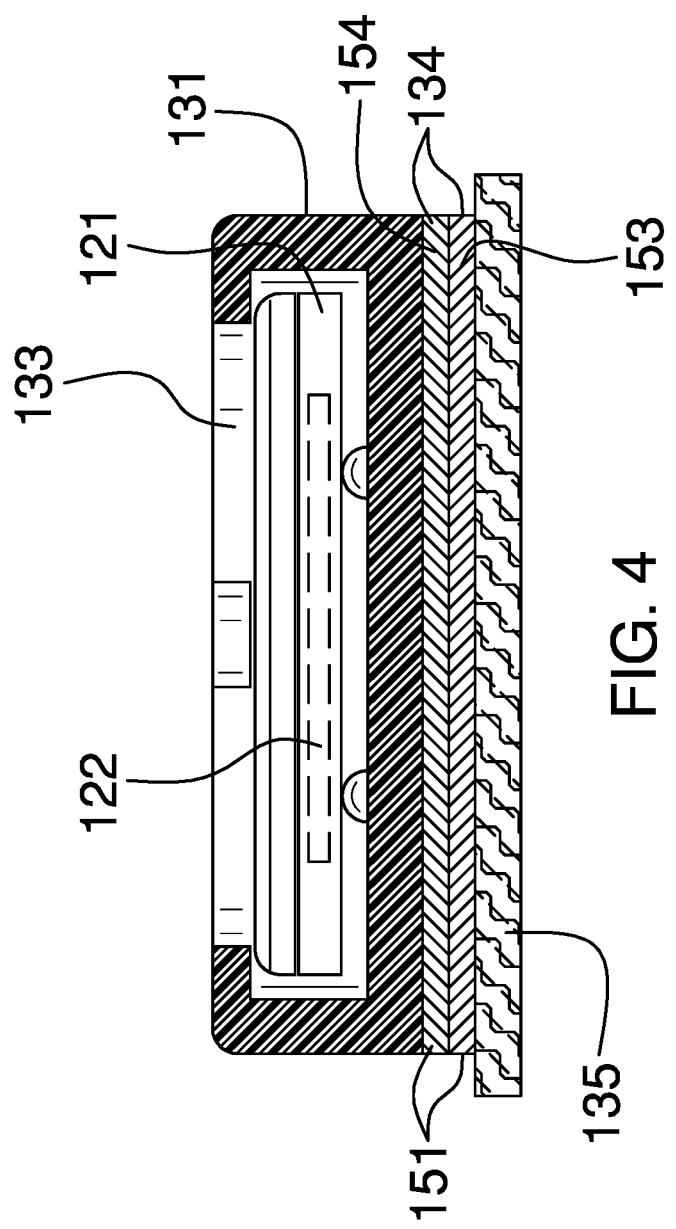
FIG. 4 is a cross-sectional view of an embodiment of the disclosure across 4-4 as shown in FIG. 1.
Figure 6:
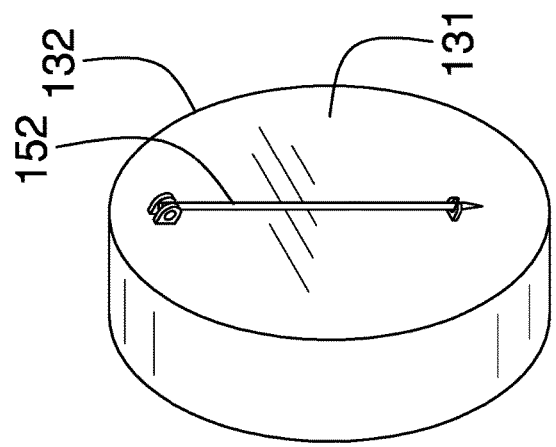
FIG. 6 is a back view of an alternate embodiment of the disclosure.
Figure 5:
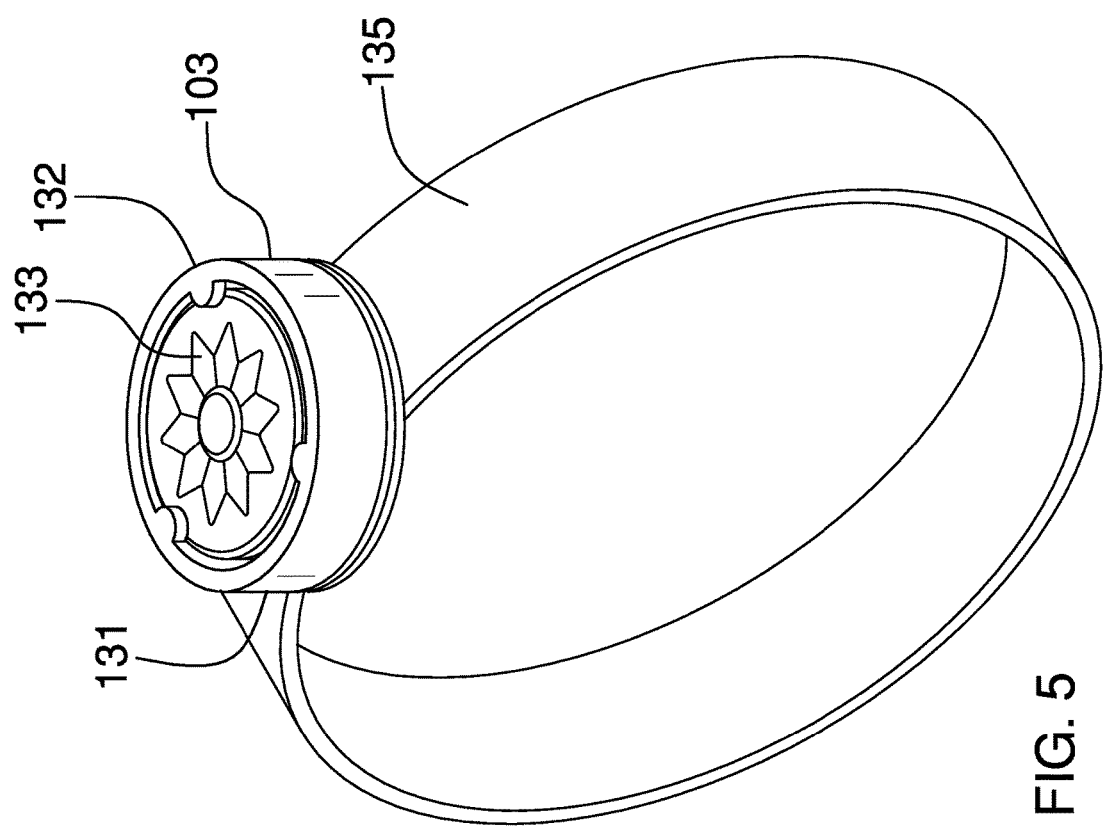
FIG. 5 is a perspective view of an alternate embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The person monitoring system 100 (hereinafter invention) is a proximity surveillance apparatus. The invention 100 comprises an interrogator 101, a tag 102, and an accessory 103. A communication link 104 is established between the interrogator 101 and the tag 102 at predetermined, but not necessarily regular, intervals to ensure that the tag 102 is in the proximity of the interrogator 101. The tag 102 attaches to an accessory 103. The invention 100 is adapted for use with a first person 141 and a second person 142. The first person 141 carries the interrogator 101. The second person 142 wears the accessory 103 with the tag 102. Should the communication link 104 fail to be established, the interrogator 101 initiates an alarm informing the first person 141 that the second person 142 is no longer nearby.

The communication link 104 further comprises an interrogation signal 105 and a reflected signal 106.

The interrogator 101 comprises a personal data device 111 that is configured to transmit an interrogation signal 105 at a previously specified radio frequency. The personal data device 111 is further configured to receive the reflected signal 106 as a radio frequency signal. The transmission of the interrogation signal 105 and the receipt of the reflected signal 106 is supervised by an application 112.

The application 112 is a logical mechanism that is incorporated into the personal data device 111 that: 1) initiates the transmission of the interrogation signal 105 at predetermined intervals; 2) confirms the receipt of the reflected signal 106; and, 3) should the receipt of the reflected signal 106 not be confirmed the application 112 generates an alarm through the personal data device 111.

The personal data device 111 further comprises a near field communication functionality 113. The near field communication functionality 113: 1) physically generates the interrogation signal 105; and, receives and processes the reflected signal 106 for the application 112. The personal data devices incorporating the near field communication functionality 113 described in this paragraph are readily and commercially availability.

The tag 102 comprises a commercially available RFID tag 121 which are also commonly referred to as a token. The tag 102 is an active RFID tag 121 using technology similar to the technology used for the automatic collection of road tolls. The RFID tag 121 is powered by a battery 122 that is connected the RFID tag 121. The RFID tag 121 technology described in this paragraph is well known and documented in the electrical arts.

Figure 7:
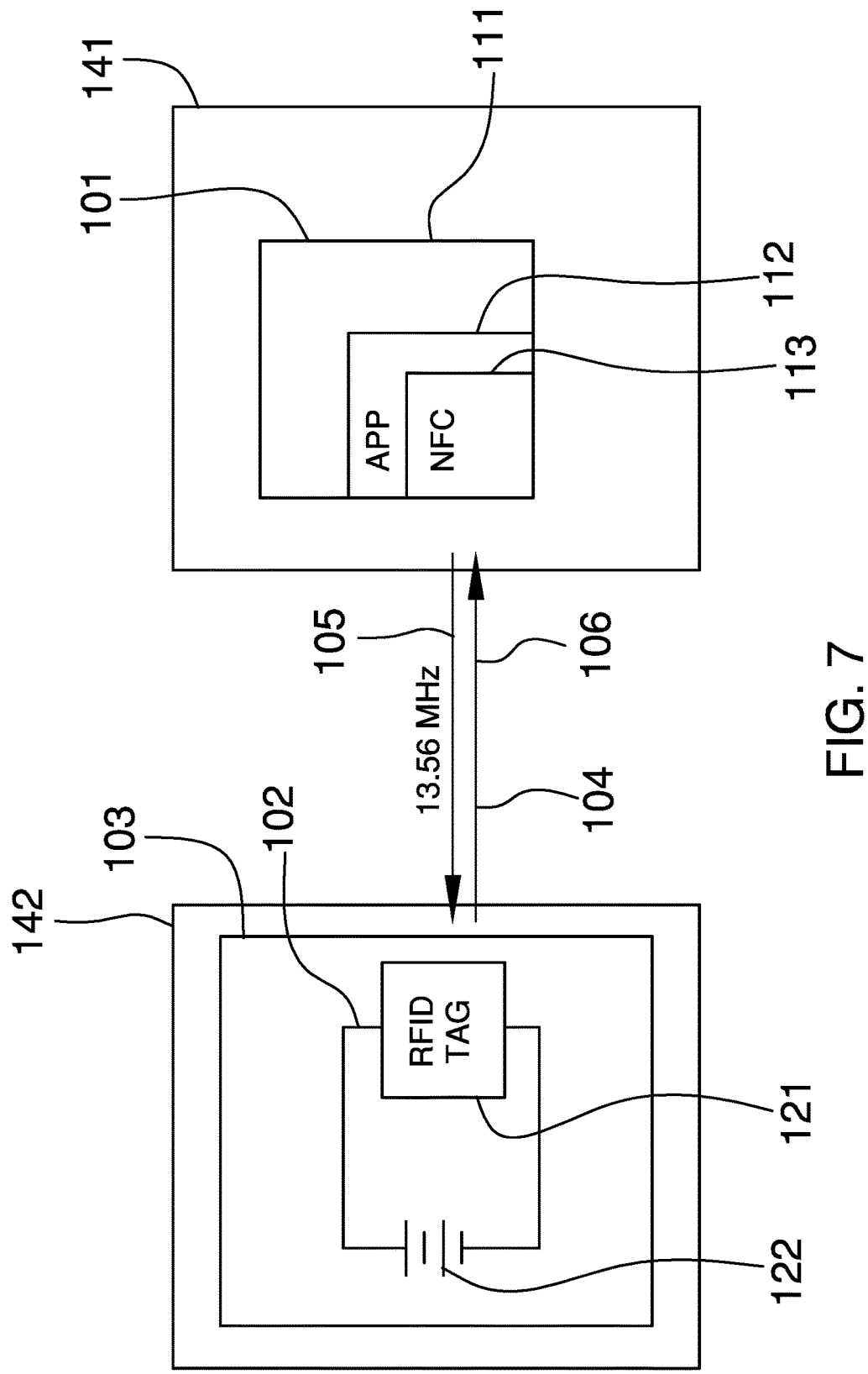
FIG. 7 is a block diagram or schematic view of an embodiment of the disclosure.

The theory of operation of the interrogator 101 and the tag 102 is described in this paragraph. As shown in FIG. 7, the near field communication functionality 113 of the personal data device 111 generates the interrogation signal 105. The tag 102 modifies the wave form (though generally not the frequency) of the interrogation signal 105 and reflects the modified wave form back to near field communication functionality 113. The modification made to the wave form is sufficient to uniquely identify the RFID tag 121. The unique identification insures that RFID tag 121 associated with the proper second person 142 is responding to the interrogation signal 105. The purpose of using an active RFID tag 121 is to extend the range of the near field communication functionality 113. Near field communication functionality 113 is intended to operate at close range (<20 cm). By using an active RFID tag 121, this range can be extended. While, at the frequencies discussed below, existing technologies can increase the range up to 100 meters the inventor anticipates a practical effective range of approximately 10 meters for the invention 100.

In the first potential embodiment of the disclosure, the previously specified radio signal frequency is 13.56 MHz. On some personal data devices 111 it is anticipated that it may be required to supplement the near field communication functionality 113 with a power booster to increase the range of interrogation signal 105.

The accessory 103 comprises a housing 131, a fastener 134 and a textile 135. As shown most clearly in FIGS. 1, 2, and 3, the housing 131 is a rigid casing that contains the tag 102. The textile 135 is a readily and commercially available textile. The fastener 134 is a device that attaches the housing 131 to the textile 135. Suitable fasteners include, but are not limited to, snaps, buttons, pins 152, and hook and loop fasteners 151. As shown most clearly in FIGS. 1, 2, and 3, the housing 131 further comprises a capped tube 132 and a closure 133. The inner diameter of the capped tube 132 is sized to receive the RFID tag 121 and the battery 122. The closure 133 is a lid that is intended to close the open face of the capped tube 132. Tubular devices, such as flashlights, that receive and operate batteries 122 and electrical circuits are well known and documented in the electrical arts.

In the first potential embodiment of the disclosure, as shown in FIGS. 1 through 3, the fastener 134 is a hook and loop fastener 151. The first hook or loop surface 153 of the hook and loop fastener 151 is attached to the textile 135 with a sewn seam. The second hook or loop surface 154 of the hook and loop fastener 151 is attached to the capped tube 132 with an adhesive.

In a second potential embodiment of the disclosure, as shown in FIGS. 1 through 3, the fastener 134 is a pin 152.

The capped tube 132 and the closure 133 are formed from a molded plastic. The conductivity of metals will interfere with radio transmissions through the capped tube 132 and the closure 133 and is therefore not preferred in the formation of the capped tube 132 and the closure 133.

To use the invention 100, the application 112 is initiated on the personal data device 111 and carried by the first person 141 while the accessory 103 with the tag 102 is worn by the second person 142.

The following definitions were used in this disclosure:

Accessory: As used in this disclosure, an accessory is an object that adds to the convenience or attractiveness of, but is not required for the use of, a basic clothing set.

Application or App: As used in this disclosure, an application or app is a self-contained piece of software that is especially designed or downloaded for use with a personal data device.

Battery: As used in this disclosure, a battery is a container consisting of one or more cells, in which chemical energy is converted into electricity and used as a source of power.

Capped Tube: As used in this disclosure, a capped tube is a tube with one closed end and one open end.

Fastener: As used in this disclosure, a fastener device that is used to join or affix two objects.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Housing: As used in this disclosure, a housing is a rigid casing that encloses and protects one or more devices.

Inner Diameter: As used in this disclosure, the term inner diameter is used in the same way that a plumber would refer to the inner diameter of a pipe.

Outer Diameter: As used in this disclosure, the term outer diameter is used in the same way that a plumber would refer to the outer diameter of a pipe.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

RFID: As used in this disclosure, RFID refers to Radio Frequency Identification technology. RFID is a wireless technology that uses electromagnetic field to identify and retrieve data from tracking tags that are placed on an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency.

Seam: As used in this disclosure, a seam is a joining of: 1) a first textile to a second textile; 2) a first sheeting to a second sheeting; or, 3) a first textile to a first sheeting.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Textile: As used in this disclosure, a textile material that is woven, knitted, braided or felted. Synonyms in common usage for this definition include fabric and cloth.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A proximity surveillance apparatus comprising:
an interrogator, a tag, and an accessory;
wherein a communication link is established between the interrogator and the tag;
wherein the communication link is established at predetermined intervals;
wherein the communication link ensures that the tag is in the proximity of the interrogator;
wherein the communication link further comprises an interrogation signal and a reflected signal;
wherein the tag attaches to the accessory;
wherein the proximity surveillance apparatus is adapted for use with a first person and a second person;
wherein the first person carries the interrogator;
wherein the second person wears the accessory with the tag;
wherein should communication link fail to be established the interrogator initiates an alarm;
wherein the interrogator comprises a personal data device that is configured to transmit the interrogation signal at a first predetermined radio signal frequency;
wherein the personal data device is further configured to receive the reflected signal at a second predetermined radio frequency signal;
wherein the first radio frequency and the second radio frequency are identical;
wherein the personal data device further comprises a near field communication functionality;
wherein the near field communication functionality physically generates the interrogation signal;
wherein the near field communication functionality physically receives the reflected signal;
wherein the near field communication functionality physically processes the reflected signal;
wherein the tag comprises an RFID tag;
wherein the RFID tag is an active RFID tag;
wherein the RFID tag is powered by a battery;
wherein the first predetermined radio signal frequency is 13.56 MHz;
wherein the accessory comprises a housing, a fastener and a textile;
wherein the housing is a rigid casing that contains the tag;
wherein the fastener is a device that attaches the housing to the textile;
wherein the fastener is selected from the group consisting of snaps, buttons, pins, and hook and loop fasteners;
wherein the housing further comprises a capped tube and a closure;
wherein the closure is a lid that is intended to close the open face of the capped tube;
wherein the inner diameter of the capped tube is sized to receive the RFID tag and the battery;
wherein the RFID tag and the battery are inserted in the capped tube;
wherein the fastener is a hook and loop fastener;
wherein the hook and loop fastener further comprises a first hook or loop surface and a second hook or loop surface;
wherein the first hook or loop surface is attached to the textile with a sewn seam;
wherein the second hook or loop surface is attached to the capped tube with an adhesive.

2. The proximity surveillance apparatus according to claim 1
wherein the transmission of the interrogation signal and the receipt of the reflected signal is supervised by an application;
wherein the application is a logical mechanism that is incorporated into the personal data device;
wherein the application initiates the transmission of the interrogation signal at predetermined intervals;
wherein the application confirms the receipt of the reflected signal;
wherein the application generates an alarm through the personal data device.

3. The proximity surveillance apparatus according to claim 1
wherein the near field communication functionality physically receives the reflected signal;
wherein the near field communication functionality physically processes the reflected signal;
wherein the personal data device generates the interrogation signal;
wherein the tag modifies the wave form of the interrogation signal and reflects the modified wave form back to near field communication functionality;

wherein the modification made to the wave form is sufficient to uniquely identify tag.

* * * * *